US009597591B2

United States Patent
Okamoto et al.

(10) Patent No.: US 9,597,591 B2
(45) Date of Patent: Mar. 21, 2017

(54) SENSORY VIDEO GAME MACHINE

(75) Inventors: Koji Okamoto, Kanagawa (JP); Hachitaro Sato, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 2131 days.

(21) Appl. No.: 11/570,296

(22) PCT Filed: Jun. 13, 2005

(86) PCT No.: PCT/JP2005/010810
§ 371 (c)(1),
(2), (4) Date: Dec. 8, 2006

(87) PCT Pub. No.: WO2005/120658
PCT Pub. Date: Dec. 22, 2005

(65) Prior Publication Data
US 2007/0225054 A1 Sep. 27, 2007

(30) Foreign Application Priority Data
Jun. 11, 2004 (JP) .................................. 2004-174801

(51) Int. Cl.
*A63F 13/00* (2014.01)
*A63F 13/42* (2014.01)
(Continued)

(52) U.S. Cl.
CPC .......... *A63F 13/42* (2014.09); *A63B 24/0021* (2013.01); *A63B 69/0002* (2013.01); *A63F 13/06* (2013.01); *A63F 13/10* (2013.01); *A63F 13/213* (2014.09); *A63F 13/537* (2014.09); *A63F 13/812* (2014.09); *A63B 2024/0012* (2013.01); *A63B 2024/0028* (2013.01); *A63B 2069/0008* (2013.01); *A63B 2102/02* (2015.10);
(Continued)

(58) Field of Classification Search
CPC ....................................................... A63F 13/42
USPC ............................................................ 463/3
See application file for complete search history.

(56) References Cited

U.S. PATENT DOCUMENTS 4,515,365 A    5/1985  Horikoshi et al.
5,833,549 A *  11/1998 Zur et al. ...................... 473/199
(Continued)

FOREIGN PATENT DOCUMENTS

EP    1184059      3/2002
JP    2001-104636  4/2001
(Continued)

*Primary Examiner* — Kang Hu
*Assistant Examiner* — Thomas H Henry
(74) *Attorney, Agent, or Firm* — Rankin, Hill & Clark LLP

(57) ABSTRACT

This invention provides a game apparatus for a virtual or simulation game that allows a game player to readily recognize that a game tool is improperly operated. Image display means 55 displays on a screen of a television set 5 no character, which plays on the screen in place of the game player. Motion determination means 53 determines, based on the motion signal, whether or not a predetermined proper motion has been made by the player with the game tool 9 in a three dimensional space. The image display means 55 indicates on the screen that the proper motion has been made when the motion determination means 53 determines that the proper motion has been made with the game tool 9.

5 Claims, 8 Drawing Sheets

(51) Int. Cl.

| | | |
|---|---|---|
| *A63F 13/537* | (2014.01) | |
| *A63F 13/213* | (2014.01) | |
| *A63F 13/812* | (2014.01) | |
| *A63B 24/00* | (2006.01) | |
| *A63B 69/00* | (2006.01) | |
| *A63F 13/20* | (2014.01) | |
| *A63F 13/40* | (2014.01) | |
| *A63F 13/573* | (2014.01) | |

(52) U.S. Cl.
CPC ....... *A63B 2102/22* (2015.10); *A63B 2220/12* (2013.01); *A63B 2220/13* (2013.01); *A63F 13/573* (2014.09); *A63F 2300/1062* (2013.01); *A63F 2300/69* (2013.01)

(56) References Cited

U.S. PATENT DOCUMENTS

| | | | |
|---|---|---|---|
| 6,270,413 | B1 | 8/2001 | Aikawa et al. |
| 6,394,894 | B1 * | 5/2002 | Okitsu et al. .................... 463/3 |
| 6,485,374 | B1 | 11/2002 | Myerscough |
| 6,921,332 | B2 | 7/2005 | Fukunaga et al. |
| 7,331,856 | B1 | 2/2008 | Nakamura et al. |
| 7,336,575 | B2 | 2/2008 | Banno |
| 2007/0091084 | A1 | 4/2007 | Ueshima et al. |

FOREIGN PATENT DOCUMENTS

| | | |
|---|---|---|
| JP | 2001-137543 | 5/2001 |
| JP | 2001-252470 | 9/2001 |
| JP | 2002-052246 | 2/2002 |
| JP | 2002-165912 | 6/2002 |
| JP | 2004-000354 | 1/2004 |

\* cited by examiner

SENSORY VIDEO GAME MACHINE

TECHNICAL FIELD

This invention relates to a game apparatus for playing a virtual or simulation game that allows a game player to operate a game tool in a three dimensional space in such a manner that the game is implemented according to a detected motion of the game tool, to a game image display method, and to a game image display program of the apparatus.

RELATED ART

Japanese Patent Publication No. 2001-104636 discloses a game apparatus for a virtual or simulation game such as baseball and table tennis. In the game apparatus for a simulated baseball game disclosed in this publication, for example, an acceleration sensor is mounted in a game tool which imitates a bat. When a game player swings the bat, the acceleration sensor detects a motion of the bat and a motion signal is outputted. A ball, or a movable object, pitched by a pitcher is displayed on a screen of a television set, and a subsequent movement of the ball is determined based on the motion signal which detects the motion of the bat. No character, which plays on the screen of the television set in place of the game player, is displayed, but pitching results of the pitcher, scores and others are displayed. Patent Document 1: Japanese Patent Publication No. 2001-104636 FIG. 1 and FIG. 2

DISCLOSURE OF THE INVENTION

Problems to be Solved by the Invention

A conventional game apparatus for a virtual or simulation game is constructed in such a manner that whether or not a bat (or a game tool) has been operated properly by a game player can be confirmed by an image of a batted ball flying away that is displayed on a screen as a result of an outputted motion signal. The game player may sometimes continue with the game without correcting the bat swing (how to operate the game tool) since the player groundlessly assumes that a sensor is poorly sensitive or electrical connections are not good in the apparatus without knowing that there is a problem with how to swing the bat (or how to operate the game tool).

An object of the present invention is to provide a game apparatus for a virtual or simulation game, which allows a game player to readily recognize that the game tool is improperly operated.

Another object of the present invention is to provide a game apparatus for a virtual or simulation game, which allows a game player, who plays the game without reading an instruction manual of the game apparatus, to readily recognize that the game tool is improperly operated.

A further object of the present invention is to provide a game apparatus for a virtual or simulation game, which allows a game player to know whether or not the game tool is operated in such a manner that the game tool can be detected when a motion of the game tool is detected using reflection of light.

Yet another object of the present invention is to provide a game apparatus for a virtual or simulation game, in which a false detection can be prevented as much as possible when a motion of a game tool is detected using reflection of light.

Still another object of the present invention is to provide a game image display method and a game image display program, which allow a game player to readily recognize that a game tool is improperly operated.

Means to Solve the Problems

A game apparatus for playing a virtual or simulation game according to this invention comprises a game tool to be operated by a game player in a three dimensional space, motion signal generation means for detecting a motion of the game tool in the three dimensional space and outputting a motion signal according to the detected motion, and image display means having a function of determining a movement of a movable object such as a ball displayed on a screen based on the motion signal. The image display means displays no character, which plays on the screen in place of the game player. Such a game apparatus for a virtual or simulation game allows a game player to feel as if he/she participates in an actual game since the game apparatus displays no character which plays on the screen in place of the game player. The present invention especially comprises motion determination means which determines whether or not a predetermined proper motion has been made by the game player with the game tool in the three dimensional space. The image display means indicates on the screen that a proper motion has been made when the motion determination means determines that the proper motion has been made with the game tool. Thus, the game player can readily recognize that the game tool is improperly operated, based on what is indicated on the screen. Accordingly, the game player can carry on the game properly since he/she can be aware of the proper motion of the game tool.

A "proper motion" used herein means a motion, according to which a motion signal necessary for carrying on the game, can be generated when the game tool is operated. When a sensor is mounted in the game tool, it is determined that a proper motion has not been made if an appropriate motion signal cannot be generated since the game tool is not properly held by the player, a posture of the player is not appropriate for operating the game tool, or the player operates the game tool at an improper angle. When a sensor is not mounted in the game tool but a sensor for detecting a motion of the game tool is mounted in a body of the game apparatus, it is determined that a proper motion has not been made if an appropriate motion signal cannot be generated since the game tool is improperly disposed with respect to the body of the game apparatus, the distance between the game tool and the body of the game apparatus is not proper, the game tool has passed an improper zone.

When the game tool is a simulated-sports game tool that imitates sports equipment such as a bat and a racket, it is preferable that image display means indicates that a proper motion has been made in a visibly confirmable representation by various ways such as moving an imitated image of the sports equipment on the screen and changing colors of the imitated image. Even a game player who has not read an instruction manual of the game apparatus or even a child can readily notice that the imitated image of the sports equipment moves on the screen or the colors of the imitated image is changed and can accordingly understand how to operate the game tool properly.

Likewise, when the game tool is a wearable game tool that is a substitution for a shoe for the player's foot or for a glove for the player's hand, it is preferable that image display means indicates that a proper motion has been made in a visibly confirmable representation by various ways such as moving an imitated image of the wearable game tool on the screen and changing colors of the imitated image. When the wearable game tool such as a glove is transformable, a visibly confirmable representation may be an opened or closed glove.

The present invention can be applied to either case where the motion signal generation means and image display means are received in the body of the game apparatus or where the motion signal generation means is received in the game tool.

When a motion of the game tool is detected using reflection of light, the motion signal generation means and image display means are received in the body of the game apparatus. The game tool has on its surface a light-reflecting material that actively reflects light. In this case, the motion signal generation means includes a light-emitting element that emits out light in the three dimensional space in which the game tool is operated and a light-receiving element that receives reflected light that has been emitted from the light-emitting element and reflected on the light reflecting material. The motion signal is generated based on an output from the light-receiving element. A price of the game apparatus can be lowered by using reflection of light, since an expensive sensor is not necessary for the game apparatus. Since the sensor is not mounted in the game tool which is always subjected to shocks or impacts, the life of the sensor is not reduced and occurrences of failure due to poor electrical contacts are prevented from increasing.

When a light-emitting element and a light-receiving element are disposed in the body of the game tool, a light-emitting element receiving hole for receiving the light-emitting element and a light-receiving element receiving hole are disposed at a predetermined interval in a top wall portion of the body of the game tool. It is preferable that the light-receiving element is located lower than the light-emitting element. With this arrangement, the light-receiving element is located at a position where only the light emitted from the light-emitting element and reflected on the game tool can be received, thereby preventing an erroneous detection from occurring. How far the light-receiving element should preferably be located lower than the light-emitting element depends upon various factors such as a quantity of light emitted from the light-emitting element, a distance between the light-emitting element and the game tool, and a diameter dimension of the light-receiving element receiving hole. The best positioning of the elements may be determined during the design process. When the light-receiving element and the light-emitting element are received in the light-receiving element receiving hole and the light-emitting element receiving hole respectively, even though the light-receiving element and the light-emitting element are mounted slightly aslant in the respective holes, the respective holes work as a guide for the light, thereby preventing a detection scope from deviating from an originally intended area, and allowing reflected light to be received in the same manner as the light-receiving element and light-emitting element are mounted in the holes without a slant.

A game image display method according to the present invention detects a motion of a game tool when a game player operates the game tool in a three dimensional space, and determines a movement of a movable object such as a ball displayed on a screen, based on a motion signal according to the motion. No character, which plays on the screen in place of the game player, is displayed. It is determined based on the motion signal whether or not a predetermined proper motion has been made by the game player with the game tool in the three dimensional space. It is indicated on the screen that the proper motion has been made when it is determined that the proper motion has been made by the game player with the game tool.

A game image display program according to the present invention implements in a computer a function of outputting a motion signal according to a motion of a game tool when a game player operates the game tool in a three dimensional space, a function of determining a movement of a movable object such as a ball displayed on a screen based on the motion signal, a function of determining based on the motion signal whether or not a predetermined proper motion has been made by the player with the game tool in the three dimensional space, and a function of indicating on the screen that the proper motion has been made when it is determined that the proper motion has been made by the player with the game tool.

BEST MODE FOR CARRYING OUT THE INVENTION

Figure 1:
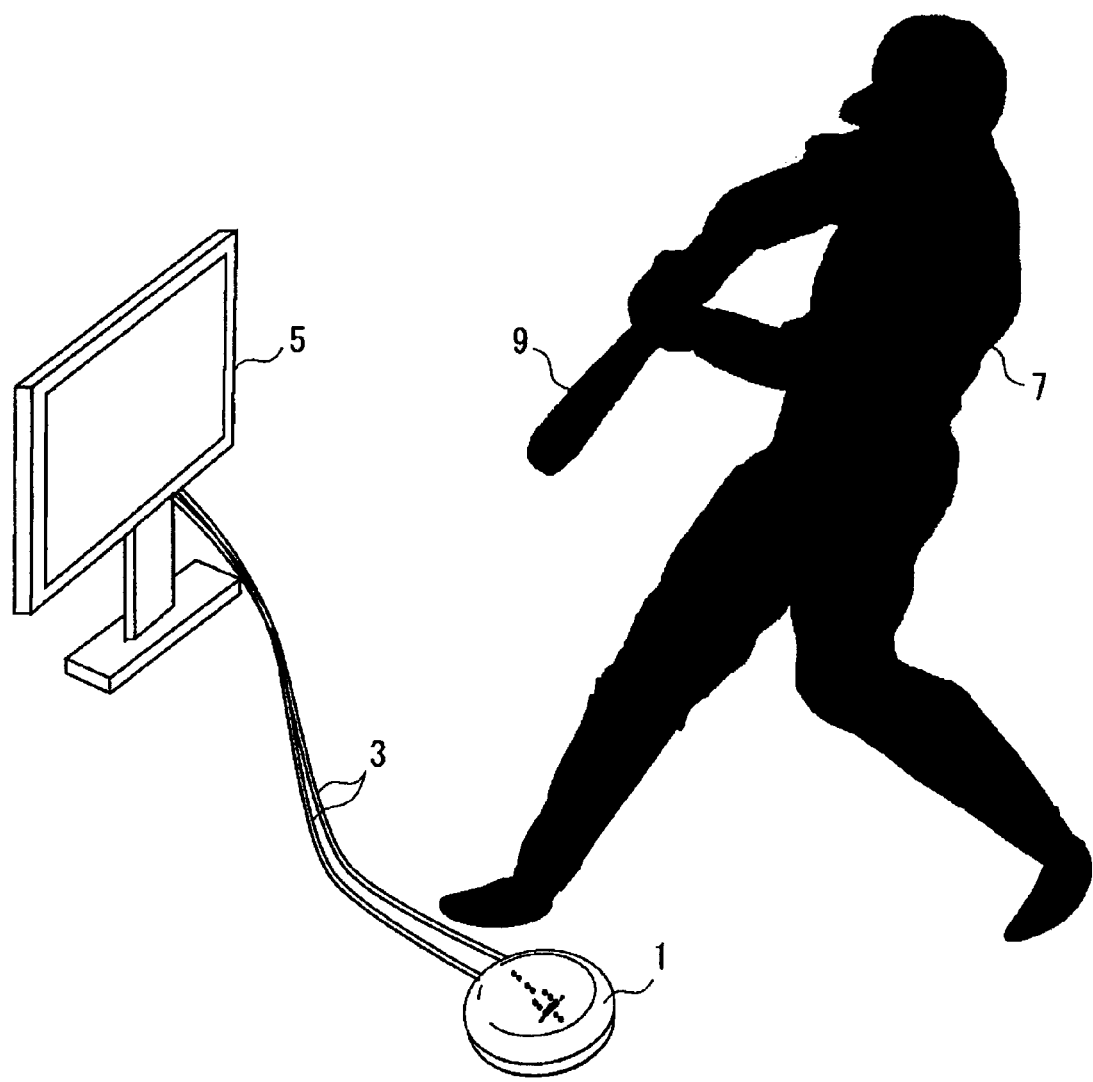
FIG. 1 illustrates one scene in which a game apparatus for a virtual or simulation game is used in an embodiment of the present invention as applied to such a game apparatus for a virtual or simulation game.

An embodiment of the present invention will now be described in detail with reference to the accompanying drawings. FIG. 1 illustrates one scene in which a game apparatus for a virtual or simulation game is used in an embodiment of the present invention as applied to a game apparatus for such a virtual or simulation game. In this figure, a body 1 of the game apparatus with switches thereof omitted from the illustration is connected directly to a television set 5 via a cord 3, and a game tool 9 that imitates a bat to be operated (swung) by a player 7 is used as a part of an input device.

Figure 2:
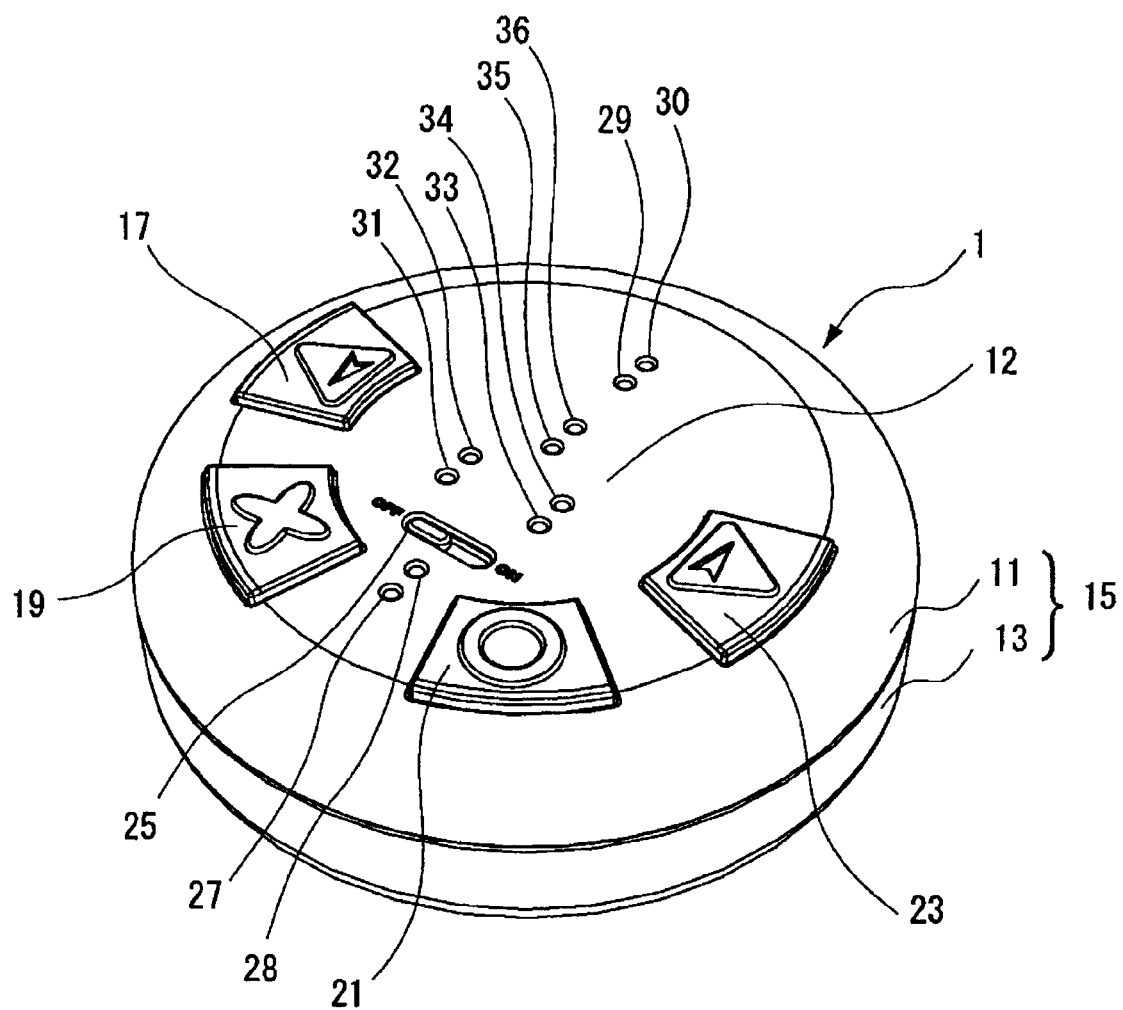
FIG. 2 is a perspective view of a body of the game apparatus used in this embodiment.
Figure 3:
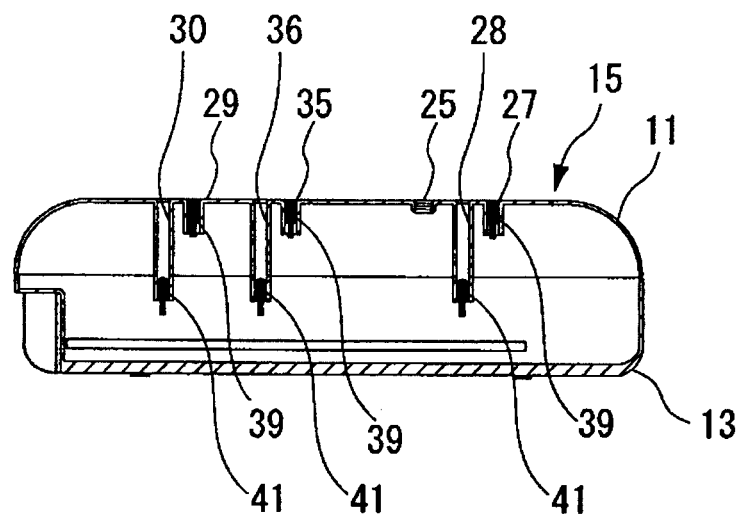
FIG. 3 is a cross-sectional view of the body of the game apparatus of FIG. 2, in which most of the internal mechanism is not illustrated.

FIG. 2 is a perspective view of the body 1 of the game apparatus used in this embodiment. FIG. 3 is a cross-sectional view of the body 1 of the game apparatus, in which most of the internal mechanism is not illustrated. The body 1 of the game apparatus is provided with a casing 15 which is constituted by combining an upper half-portion 11 and a lower half-portion 13 that are formed by splitting the casing 15 into two up and down (in a vertical direction). Inside the casing 15 is disposed a circuit which includes a microcomputer as its principal component. On the surface of the upper half-portion 11 are arranged four pushbutton switches 17 to 23 (that is, 17, 19, 21 and 23) so that the switches can be pressed down. A sliding-type power switch 25 is disposed in an area 12, of the upper half-portion 11, which is surrounded by the four pushbutton switches 17 to 23. These pushbutton switches 17 to 23 are operated when making an important selection in the course of the game, such as selection of the game type, pitcher, and repertoire of pitches. In the area 12 of the upper half-portion 11 are formed ten through-holes 27 to 36 which are paired up two by two. The through-holes 27 and 28, through-holes 29 and 30, through-holes 31 and 32, through-holes 33 and 34, and through-holes 35 and 36 are paired respectively. Light-emitting elements 39 are respectively disposed inside the through-holes 27, 29, 31, 33, and 35. Light-receiving elements 41 are respectively disposed inside the through-holes 28, 30, 32, 34, and 36. In this embodiment where the game apparatus is used for a simulated baseball game, only the light-emitting elements 39 disposed inside the through-holes 27, 28 and light-receiving elements 41 disposed inside the through-holes 29, 30 are actually used for detecting a motion (operation timing) of the game tool 9. As shown in FIG. 3, the light-receiving elements 41 are disposed lower than the light-emitting elements 39 (in the vicinity of the lower half-portion 13). In other words, the vertical length of each of the through-holes 28, 30, 32, 34, and 36 receiving the light-receiving elements 41 is longer than the vertical length of each of the through-holes 27, 29, 31, 33, and 35 receiving the light-emitting elements 39. In view of the light-emitting element 39, the shorter the distance of the light-emitting element 39 and the game tool 9 equipped with a light-reflecting material is, the more light will be reflected. In view of the light-receiving element 41, if the light-receiving element 41 is disposed too high (if the location thereof is of the same height as the light-emitting element 39 or higher than that), the light-receiving element 41 also receives the light other than the light emitted from the light-emitting element 39 and reflected by the game tool 9. Consequently, a signal outputted from the light-receiving element 41 includes much noise to cause an erroneous detection. A desirable distance in the vertical direction (up and down direction) between the light-receiving element 41 and the light-emitting element 39 is varied depending on various factors such as the height of a zone which is located above the body 1 of the game apparatus and through which the game tool 9 passes, a quantity of light emitted from the light-emitting element 39, an emission angle range of the light emitted from the light-emitting element 39 (an angular range where the light emitted from the light-emitting element 39 intersects the zone), a light-receiving angle range (an angular range in which light reflected from the game tool 9 through the through-holes 27, 29, 31, 33, and 35 can be received) of the light-receiving element 41 disposed on the bottom of each of the through-holes 28, 30, 32, 34, and 36, and a reflectance of the light reflecting material disposed on the game tool 9. Therefore, how long the above-mentioned distance should be is determined according to design factors. When the light-receiving elements 41 and the light-emitting elements 39 are received in the light-receiving element receiving holes 28, 30, 32, 34 and the light-emitting element receiving holes 27, 29, 31, 33 respectively, even though the light-receiving elements 41 and the light-emitting elements 39 are mounted slightly aslant in the respective holes, the light-receiving element receiving holes 28, 30 and the light-emitting element receiving holes 27, 29 respectively work as a guide for the light, thereby preventing a detection scope from deviating from an originally intended area, and allowing reflected light to be received in the same manner as the light-receiving elements 41 and light-emitting elements 39 are mounted in the respective holes without a slant.

Figure 4:
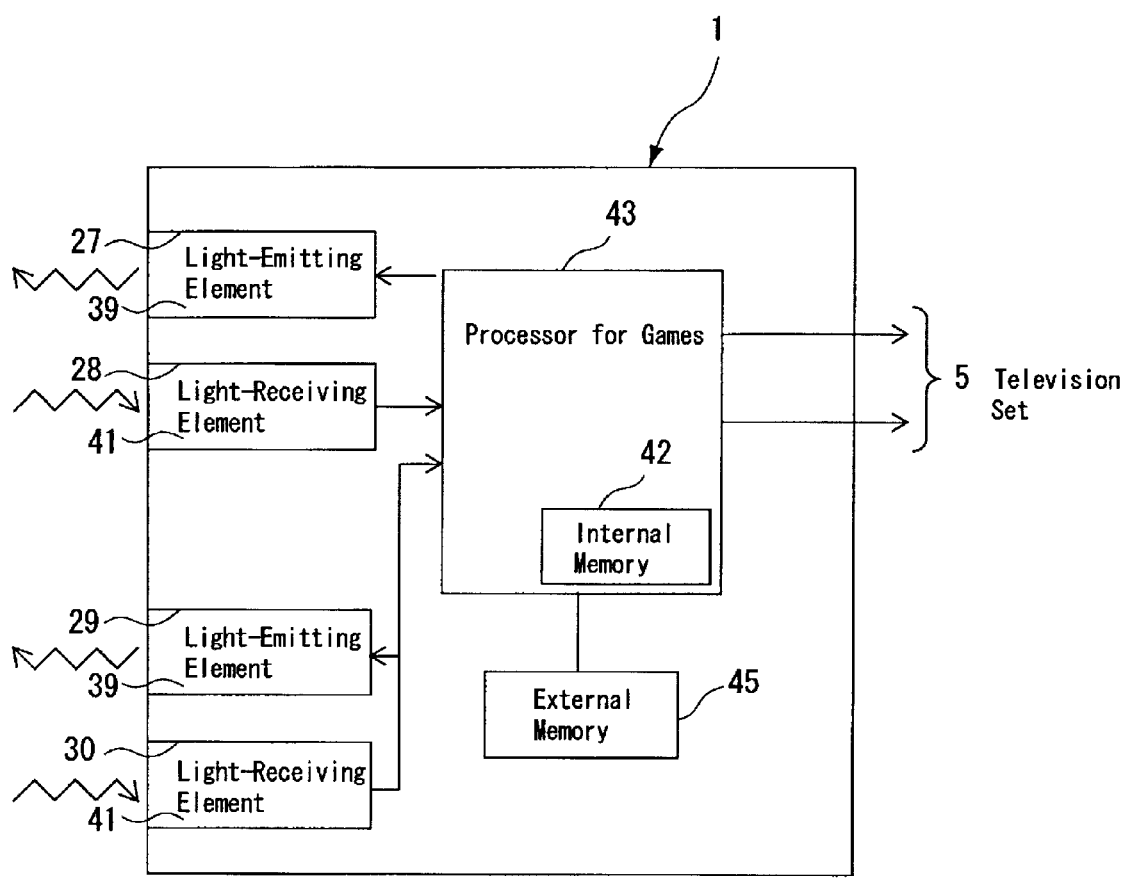
FIG. 4 is a block diagram showing principal components of a circuit installed inside the body of the game apparatus of this embodiment.

FIG. 4 is a block diagram showing principal components of a circuit installed inside the body 1 of the game apparatus according to this embodiment. Power circuits of the light-emitting elements 39 etc. are omitted from the illustration. What has been developed exclusively for a game apparatus can be applied as a processor 43 for games having an internal memory 42 which stores information acquired from a signal outputted from the light-receiving element 41. An example of such processor 43 for games (including a microcomputer) is shown in U.S. Pat. No. 3,467,382, and is publicly known. However, the processor for games used in carrying out the present invention is not limited to what is disclosed in the foregoing patent publication. A program necessary for running the processor 43 for games is stored in an external memory 45. Inside the processor 43 for games are also included circuits for processing a video signal and an audio signal. Therefore, an output from the processor 43 for games is outputted directly to a television set. It is needless to say that a circuit may be constructed without using such processor 43 for games.

Figure 5:
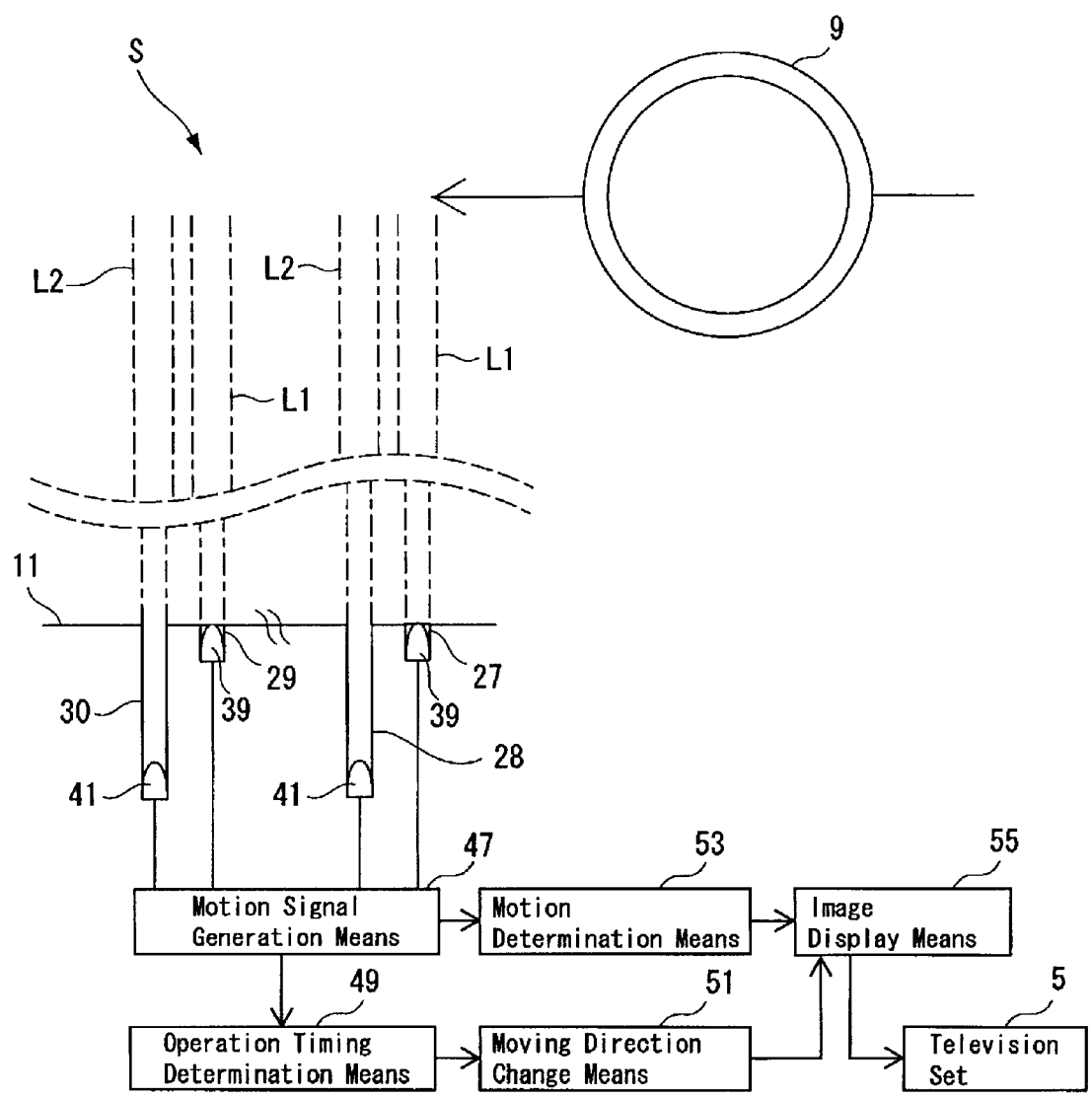
FIG. 5 is a block diagram showing function-implementing means having various kinds of functions to be implemented inside a processor for games, and also illustrates the relationship of a light-emitting element, a light-receiving element and a game tool.

FIG. 5 is a block diagram showing function-implementing means having various kinds of functions to be implemented inside the processor 43 for games, and also illustrates the relationship of the light-emitting element 39, the light-receiving element 41, and the game tool 9. The function-implementing means shown in FIG. 5 includes motion signal generation means 47, operation timing determination means 49, image display means 55, moving-direction change means 51, and motion determination means 53. It is needless to say other function-implementing means other than these function-implementing means as described above are used in an actual game apparatus.

The motion signal generation means 47 includes two light-emitting elements 39 that emit out light L1 in a three dimensional space S in which the game tool 9 is operated, and two light-receiving elements 41 which receive reflected light L2 emitted from the light-emitting elements 39 and reflected on the light reflecting material disposed on the surface of the game tool 9. In FIG. 5, for ease of understanding, the light L1 and the reflected light L2 are conveniently illustrated as beams parallel to each other. In this embodiment, one of the light-emitting elements 39 and one of the light-receiving elements 41 are used in pairs as previously explained. When the game tool 9 passes over the body 1 of the game apparatus, two light receiving signals are respectively outputted with time difference from the two light-receiving elements 41, 41. The motion signal generation means 47 generates a motion signal including information on the motion of the game tool 9 (information on the timing at which the game tool 9 was swung and the motion speed thereof) based on the two light receiving signals. The motion speed of the game tool 9 can be known by identifying a time interval between the generation of two light receiving signals. If the two light receiving signals are inputted after a predetermined time interval, or only one light receiving signal is inputted within a predetermined time interval, it can be determined that there has been a swing delay of the game tool 9. As well, the operation timing and motion speed as the game tool 9 is swung can be known from the generation time and generation interval of the two light receiving signals.

Figure 6:
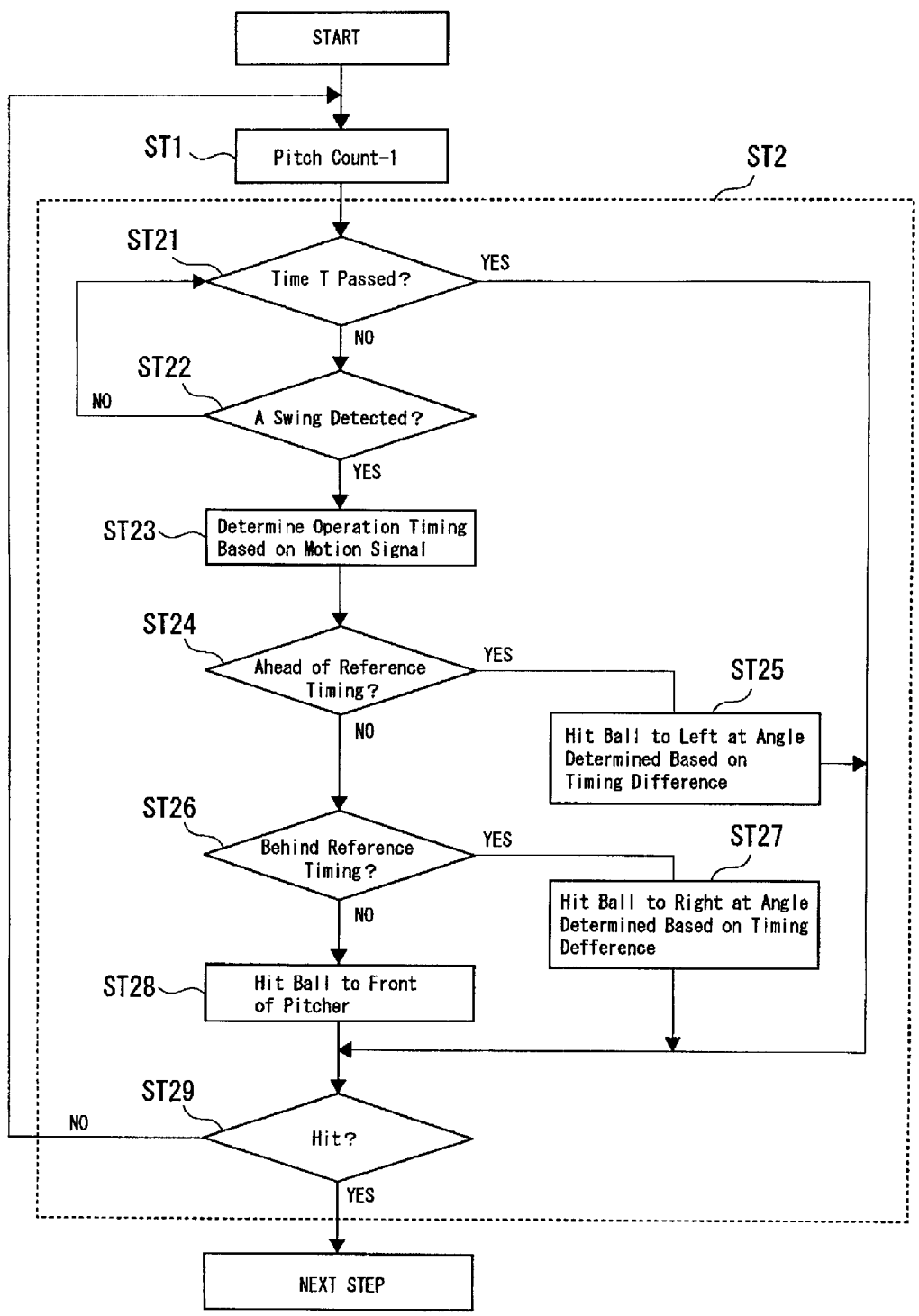
FIG. 6 is a flowchart of an example algorithm used in implementing operation timing determination means in a computer.

The operation timing determination means 49 determines timing at which the game tool 9 is swung based on the motion signal as the operation timing at which the input device is operated based on the motion signal and outputs a change command to the moving-direction change means 51 based on the operation timing. FIG. 6 is a flowchart of an example algorithm used in implementing the operation timing determination means 49 in a computer. In this algorithm, the number of balls available for pitching (the number of remaining pitches) is decremented at the time that a pitcher has pitched a ball (movable object) in the course of the game and the operation timing is determined based on this time point (step ST2). The screen of the television set 5 displays a movement of the ball in such a manner that the ball is approaching toward the player. After a predetermined time has passed since the pitcher pitched the ball (Step ST21), when a swing is detected (step ST22) and a motion signal is outputted. Details about step ST22 in this example is explained later using FIG. 7. The operation timing is determined based on the motion signal (step ST23). If the operation timing is ahead of predetermined reference timing, a change command to move (hit) the ball (movable object) leftward is outputted (step ST24, ST25). If the operation timing is behind the reference timing, a change command to move (hit) the ball rightward is outputted (step ST26, ST27). Otherwise, namely, when the reference timing and the operation timing coincide with each other, a change command to move (hit) the ball straight toward the pitcher is outputted (step ST28). Incidentally, an advance or delay of the operation timing from the reference timing determines the moving (flying) direction of the ball or an angle of the flying ball with respect to a home base (step ST25, ST27). In this example, it is determined whether or not the ball hits the target at step ST29.

The moving-direction change means 51 gives a command to the image display means 55 to output to the television set 5 a video signal that causes the ball (movable object) to be displayed on the screen as if it is moving (flying) from the pitcher toward the player after the pitcher has pitched the ball (movable object). Upon receipt of the above-mentioned change command from the operation timing determination means 49 during the movement of the ball, the moving-direction change means 51 gives a command to the image display means 55 to output to the television set 5 a video signal by which the moving (flying) direction of the ball hit by the player is changed in accordance with the change command.

Figure 7:
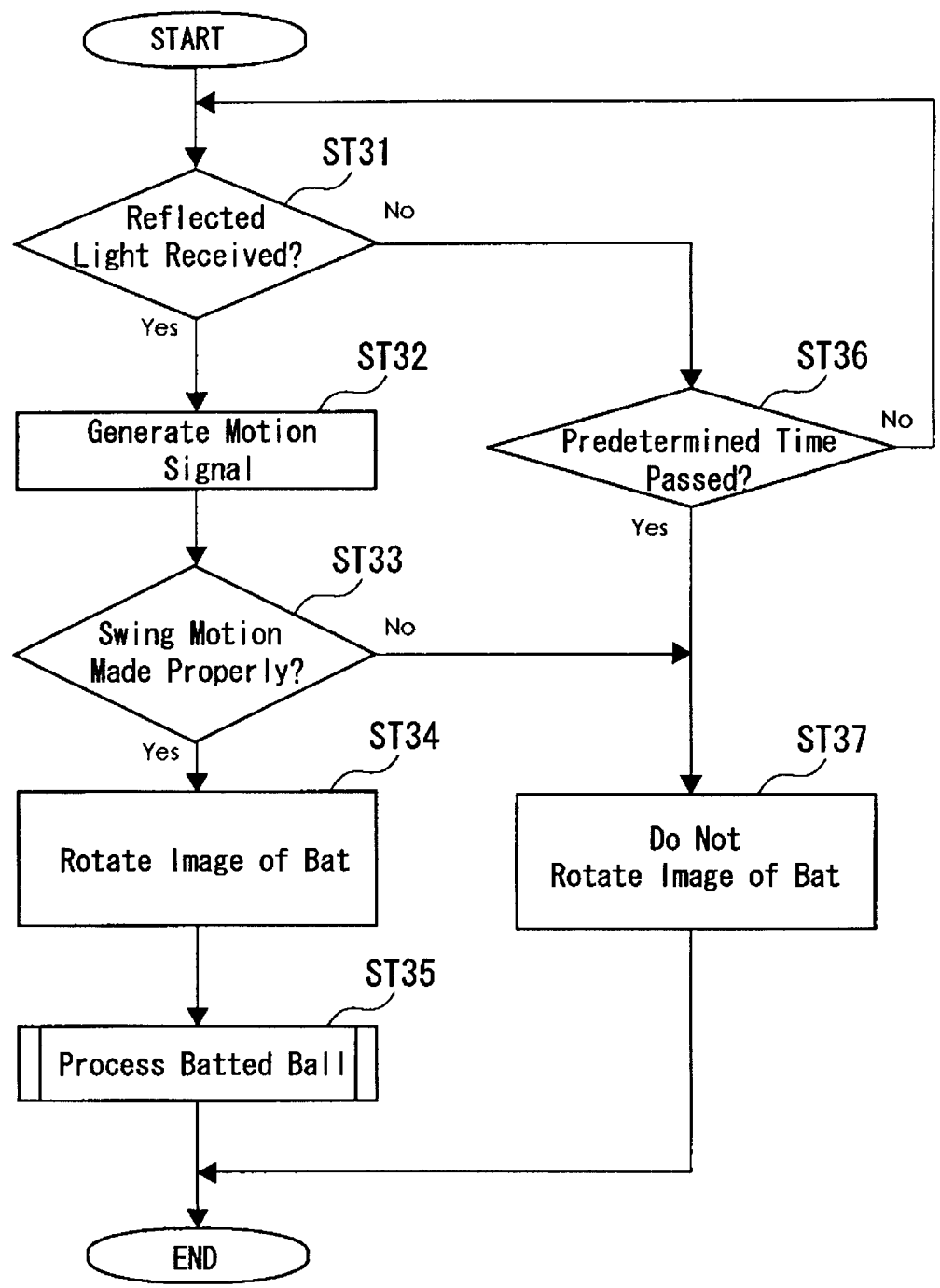
FIG. 7 is a flowchart of an algorithm for a program used when the present invention is applied to a game apparatus for a target-hitting game.

The motion determination means 53 determines whether or not a predetermined proper motion has been made by the game player with the game tool 9 in the three dimensional space, based on the motion signal. The image display means 55 indicates on the screen that the proper motion has been made when the motion determination means 53 determines that the proper motion has been made by the game player with the game tool 9. FIG. 7 is a flowchart showing an algorithm of an example of a program when some of the functions of the motion signal generation means 47, the motion determination means 53 and the image display means 55 are implemented in a computer.

A flowchart of FIG. 7 is explained as follows. During a game, after a ball has been pitched, whether or not the game player swings the game tool 9 is determined at step ST31 according to whether or not reflected light is received. Upon receiving the reflected light, a motion signal is outputted at step ST32. When the motion signal is generated, whether or not the swing motion (the motion of the game tool) is proper is determined based on the motion signal at step ST33. In this embodiment, when both of the two light-receiving elements 41 receive a light, it is determined "GOOD" (a proper motion has been made). When only one of the light-receiving elements 41 receives a light, it is determined "NG" (a proper motion has not been made). When "GOOD", an image of the bat is rotated at step ST34. A subsequent operation for a batted ball is implemented at step ST35. When no reflected light is received within a predetermined time after the pitcher has pitched the ball at step ST35, and when a swing motion is determined "NG", the image of the bat on the screen is not rotated at step ST37. With this, the game player recognizes there is a problem with the motion of the game tool (a swing of the bat). A part of the functions of the motion signal generation means 47 in FIG. 5 is implemented at step ST31 and step ST32 in the algorithm of FIG. 7. The functions of the motion determination means 53 are implemented at step ST33 and step ST36. Furthermore, a part of the functions of the image display means 55 is implemented at the step ST34 and ST37.

Figure 8:
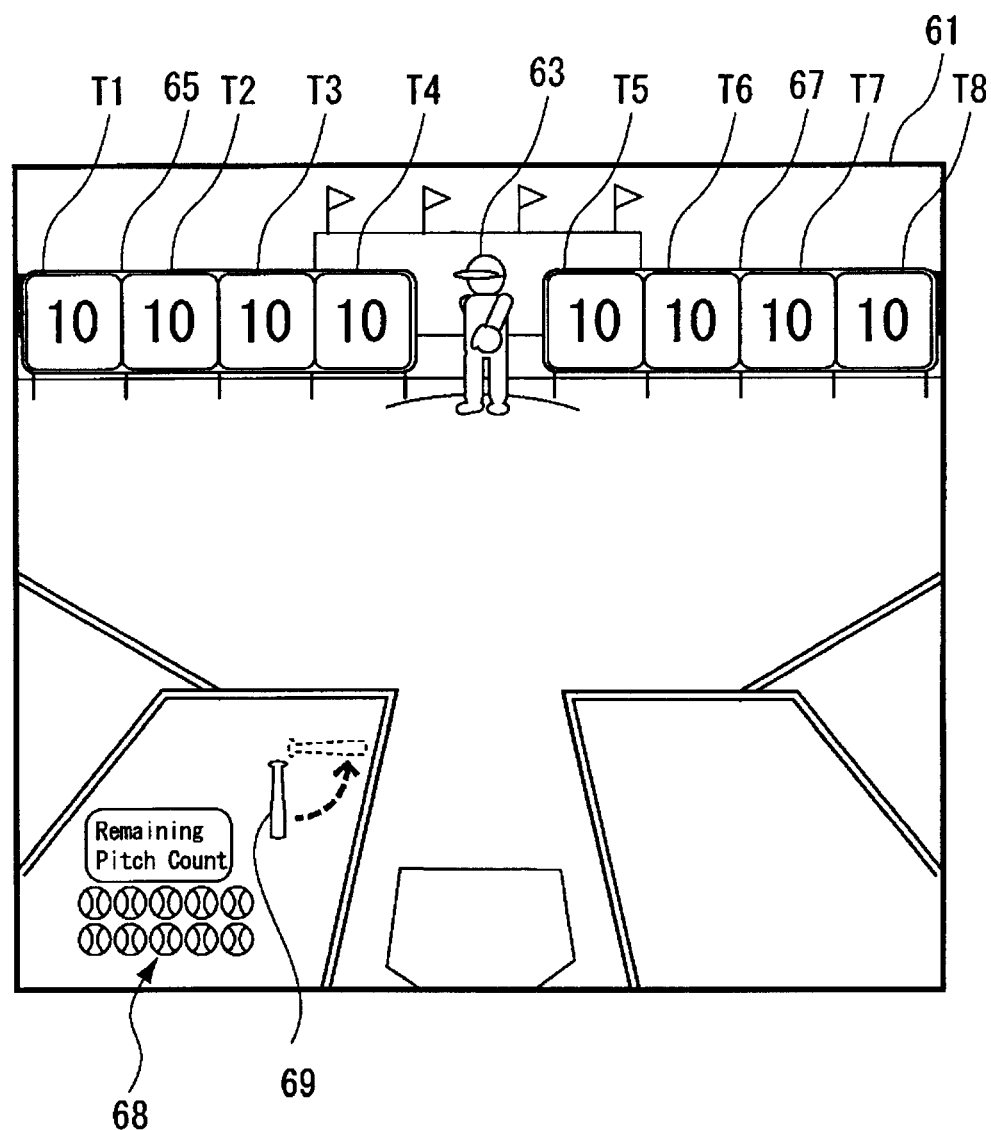
FIG. 8 illustrates an initial screen used with a game apparatus for a target-hitting game.

FIG. 8 shows one example of an initial screen when a target hitting game is implemented with the game apparatus for a virtual or simulation game according to the present invention. On a screen 61 of FIG. 8, eight target panels T1 to T8 are arranged side by side in the play field or mound, four by four on both sides of the pitcher 63. In the play field are respectively displayed target holding frame 65 which holds the four target panels T1 to T4 and a target holding frame 67 which holds the other four target panels T5-T8. Ball images 68, the number of which corresponds to the number of pitcher's remaining pitches, are displayed in the lower left area of a batter's box on the left side of the screen 61. Since FIG. 8 is the initial screen, ten balls' images are displayed as the number of the pitcher's remaining pitches. As well, the bat image 69, which is a simulated image of the game tool 9, is displayed in the upper right area of the batter's box on the left side of the screen 61. The bat image 69 moves to a position indicated with a broken line to denote that the game tool 9 has been operated properly by the player, when the motion determination means determines that the game tool 9 has been operated properly (the game tool 9 has passed through a predetermined zone above the body 1 of the game apparatus, or a proper motion signal has been outputted). It can be known from this indication whether or not the position, where the player has swung the game tool 9 which is a part of the input device, falls within a detection area of a swing detector constituted by the light-emitting elements 39 and the light-receiving elements 41 as shown in FIGS. 3 to 5. Therefore, if the bat image does not move even though the player has swung the game tool 9 within a predetermined time after the pitcher 63 pitched the ball, the player can then know that the swing position of the game tool 9 is not proper. With this indication, the player changes the position of the body 1 of the game apparatus or the standing position of the player.

In the foregoing embodiment, whether or not the game tool 9 is operated is determined using reflection of light. It is needless to say that various kinds of sensors such as an acceleration sensor can be used for determination of whether or not the game tool 9 is operated.

In the foregoing embodiment, the present invention is applied to a baseball game. It is needless to say that the present invention can be applied to any games as far as the games are played by hitting a moving movable object with a game tool, such as tennis, badminton, table tennis, and hockey.

In the foregoing embodiment, it is indicated by rotating the bat image 69 that the game tool has properly been operated. It may be indicated by changing the colors of the bat images that the game tool has properly been operated by changing the colors of the bat image. For example, when an image of a catcher's glove is displayed, it may be indicated by opening or closing the image of the catcher's glove that the game tool has properly been operated.

INDUSTRIAL APPLICABILITY

According to the present invention, the game player can readily recognize that the game tool is not properly operated, based on what is displayed on the screen. Therefore, the game player can carry on the game properly since he/she can be aware of the proper motion of the game tool.

The invention claimed is:

1. A game apparatus for playing a virtual or simulation game comprising:
   a game tool to be operated by a game player in a three dimensional space;
   motion signal generation means for detecting a motion of the game tool in the three dimensional space and outputting a motion signal according to the detected motion;
   image display means having a function of determining a movement of a movable object such as a ball displayed, based on the motion signal, on a screen where no character, which plays on the screen in place of the game player, is displayed;
   motion determination means for determining, based on the motion signal, whether or not a predetermined proper motion has been made by the player with the game tool in the three dimensional space;
   operation timing determination means for determining timing at which the game tool is operated as the operation timing based on the motion signal and outputting a change command for changing a moving direction of the movable object based on an advance or delay of the operation timing from a predetermined reference timing; and
   moving-direction change means for giving a command to the image display means to output a video signal by which the moving direction of the movable object displayed on a screen is changed in accordance with the change command,
   the image display means further having a function of displaying movement of an imitated image of the game tool on the screen to confirm that the proper motion of the game tool has been made when the motion determination means determines that the proper motion of the game tool has been made and a function of changing the moving direction of the movable object displayed on the screen in accordance with the change command.

2. The game apparatus of claim 1, wherein the motion signal generation means and the image display means are received inside a body of the game apparatus, or the motion signal generation means is received inside the game tool.

3. The game apparatus of claim 2, wherein the game tool is a simulated-sports game tool that imitates sports equipment such as a bat and a racket, or a wearable game tool that is a substitution for a shoe for the player's foot or for a glove for the player's hand; the image display means indicates that the proper motion has been made in a visibly confirmable representation by various ways including changing colors of the imitated image.

4. The game apparatus of claim 1, wherein the motion signal generation means and the image display means are received inside the body of the game apparatus; the game tool has on its surface a light-reflecting material that reflects light; the motion signal generation means includes a light-emitting element that emits out light in the three dimensional space in which the game tool is operated and a light-receiving element that receives reflected light that has been emitted from the light-emitting element and reflected on the light-reflecting material; and the motion signal is generated based on an output from the light-receiving element.

5. The game apparatus of claim 4, wherein a light-emitting element receiving hole for receiving the light-emitting element and a light-receiving element receiving hole for receiving the light-receiving element are disposed at a predetermined interval in a top wall portion of the body of the game tool, the light-receiving element is located lower than the light-emitting element.

* * * * *